United States Patent
Gourdoupi et al.

(10) Patent No.: US 7,842,733 B2
(45) Date of Patent: Nov. 30, 2010

(54) AROMATIC POLYETHER COPOLYMERS AND POLYMER BLENDS AND FUEL CELLS COMPRISING SAME

(75) Inventors: Nora Gourdoupi, Patras (GR); Nikolaos Triantafyllopoulos, Patras (GR); Valadoula Deimede, Patras (GR); Lefteris Pefkianakis, Patras (GR); Maria Daletou, Patras (GR); Stylianos Neophytides, Patras (GR); Joannis Kallitsis, Patras (GR)

(73) Assignee: Advent Technologies SA, Marousi Patras (GR)

( * ) Notice: Subject to any disclaimer, the term of this patent is extended or adjusted under 35 U.S.C. 154(b) by 737 days.

(21) Appl. No.: 11/805,635

(22) Filed: May 24, 2007

(65) Prior Publication Data

US 2008/0063923 A1  Mar. 13, 2008

Related U.S. Application Data

(60) Provisional application No. 60/843,801, filed on Sep. 11, 2006.

(51) Int. Cl.
*B01J 49/00* (2006.01)
(52) U.S. Cl. ............... 521/27; 521/30; 429/483; 429/492; 528/380; 528/391; 528/397; 528/399; 528/417; 528/423
(58) Field of Classification Search .......... 429/42; 521/27, 30; 528/380, 391, 397, 399, 417, 528/423
See application file for complete search history.

(56) References Cited

U.S. PATENT DOCUMENTS 6,232,411 B1  5/2001  Hara et al.

OTHER PUBLICATIONS

International Search Report for related International Application No. PCT/IB2007/004294 (6 pages).
Written Opinion for related International Application No. PCT/IB2007/004294 (7 pages).
Pefkianakis, Elefterios K. et al.: *"Novel Polymer Electrolyte Membrane, based on Pyridine Comtaining Poly (ether sulfone), for Application in High-Temperature Fuel Cells"* Macromolecular Rapid Communications, 26 (21), 1724-1728 CODEN: MRCOE3; ISSN 1022-1336, 2005, XP002495312.
Gourdoupi, N. et al.: *"Novel Proton Conducting Polyelectrolyte Composed of an Aromatic Polyether Containing Main-Chain Pyridine Units for Fuel Cell Applications,"* Chemistry of Materials, 15(26), 5044-5050 CODEN: CMATEX; ISSN: 0897-4756, 2003, XP002495313.
Jang et al.: *"Acid-base Polymide Blends for the Application as Electrolyte Membranes for Fuel Cells,"* Journal of Membrane Science, Sep. 1, 2006, Elsevier Scientific Publ. Company, Amsterdam, NL, pp. 321-329, XP005544281, ISSN: 0376-7388.
Daletou M. K., et al.: *"Proton Conducting Membranes Based on Blends of PBI with Aromatic Polyethers Containing Pyridine Units,"* Journal of Membrane Science, Elsevier Scientific Publ. Company, Amsterdam, NL, vol. 252, No. 1-2, Jan. 1, 2003, pp. 115-122, XP009103762, ISSN: 0376-7388.

*Primary Examiner*—Melvin C Mayes
*Assistant Examiner*—Melissa Stalder
(74) *Attorney, Agent, or Firm*—Edwards Angell Palmer & Dodge LLP; Peter F. Corless; Lisa Swiszez

(57) ABSTRACT

High temperature polymer electrolyte membranes bearing pyridine and tetramethyl biphenyl moieties are provided. Preferred polymers can exhibit good mechanical properties, high thermal and oxidative stability and high doping ability with strong acids. Further provided are MEA on PEMFC type single cells.

25 Claims, 11 Drawing Sheets

AROMATIC POLYETHER COPOLYMERS AND POLYMER BLENDS AND FUEL CELLS COMPRISING SAME

CROSS REFERENCE TO RELATED APPLICATION

This application claims priority to and the benefit of Provisional U.S. Application Ser. No. 60/843,801, filed Sep. 11, 2006, the entire contents of which are incorporated herein by reference.

BACKGROUND

1. Field of the Invention

The invention relates to new polymeric materials that comprise pyridine and/or tetramethyl biphenyl moieties. Preferred polymeric materials of the invention can exhibit high glass transition temperature (e.g. >200° C. such as up to 280° C.), high thermal and oxidative stability (e.g. >300° C. or 400° C. such as up to 450° C.) doping such as with phosphoric acid can result in high acid uptakes in preferred systems.

Following the materials characterization with conventional techniques, membrane electrode assemblies were constructed in order to study their fuel cell performance. The prepared MEAs were tested in a single cell at temperatures up to 170° C. The long term stability of the system was studied by measuring the current output at a constant voltage of −500 mV for 1000 h.

2. Background

Polymer electrolyte membrane fuel cells (PEMFCs) operating at 90° C. are currently the best candidates for use in stationary and automobile applications. Up to now Nafion, has been applied almost exclusively as polymer electrolyte. However, its conductivity is dependent on the presence of water demanding thus humidification of the feed gases while limiting the cell operation temperature to be below 100° C. At that temperature range the presence of impurities such as carbon monoxide in the hydrogen will have poisonous effect on the electrocatalyst. Even though new electrocatalysts have been developed for a typical operational temperature of 80° C., 50-100 ppm of carbon monoxide can deactivate the catalyst. The need for humidified gases as well as the demand high purity hydrogen increase the operation cost sufficiently.

Operation of the fuel cell at temperatures above 150° C. offers certain advantages such as increased catalyst activity, decreased susceptibility of the anodes catalyst to poisoning due to impurities in the fuel cell stream, easier thermal management than conventional PEM fuel cells. The basic prerequisites for a polymer to be used as high temperature electrolyte is thermal and oxidative stability, excellent mechanical properties combined with high proton conductivity after doping with a strong acid. Besides polybenzimidazole which is a well established high temperature polymer electrolyte, there is a significant effort towards the development of some novel polymeric materials which fulfill the above requirements.

Various attempts have been made to improve the mechanical properties of PBI by using polymer blends composed of PBI and a thermoplastic elastomer (Macromolecules 2000, 33, 7609, WO Patent 01/18894 A2) in order to combine the acid doping ability of the PBI with the exceptional mechanical properties of the thermoplastic elastomer. Additionally, blends of PBI with aromatic polyether copolymer containing pyridine units in the main chain have also been prepared, resulting in easily doped membranes with excellent mechanical properties and superior oxidative stability (Journal of the Membrane Science 2003, 252, 115). Certain efforts also have been made to develop low cost polymeric systems that will combine all the desired properties for application in fuel cells operating at temperatures above 150° C.

SUMMARY

We now provide new polymer materials that comprise one or more aromatic polyether polymers which comprise 1) one or more tetramethyl biphenyl groups or 2) one or more main chain pyridine units. Polymers of the invention are particularly useful as a fuel cell membrane material.

Particularly preferred polymers of the invention may include a structure of the following Formulae (I) and/or (II):

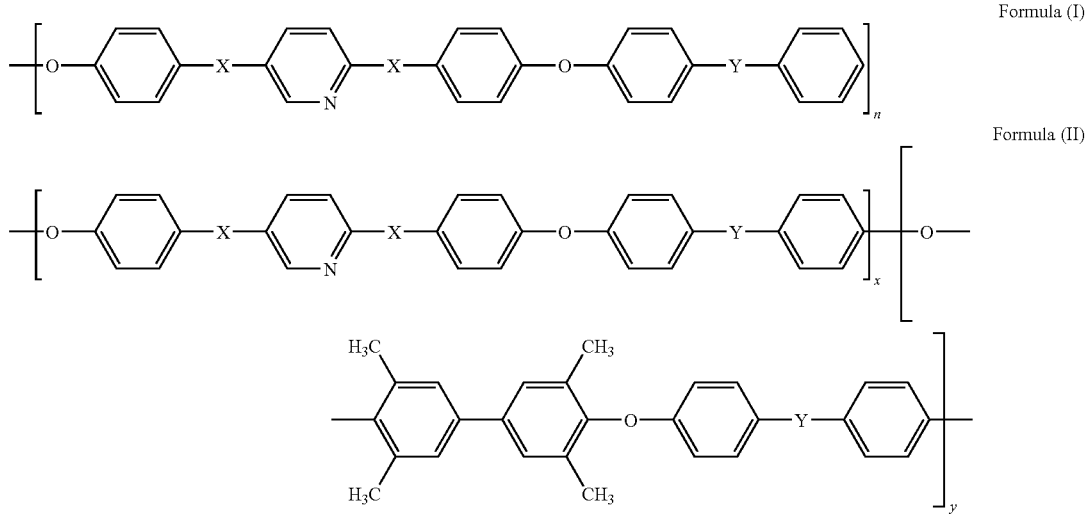

wherein in those formulae each X is independently a chemical bond, optionally substituted alkylene, optionally substituted aromatic group, a hetero linkage (O, S or NH), carboxyl or sulfone;

each Y is the same or different and is sulfone, carbonyl or a phenyl phosphinoxide unit; and n is a positive integer.

Suitable polymer materials of the invention may comprise one or more or more polymers in the form of block, random, periodic and/or alternating polymers.

In particular embodiments, an admixture (such as present as a fuel cell membrane) of polymers are provided, i.e. a blend of two or more distinct polymers, such as a first polymer having a structure of Formula (I) above blended with a second polymer having a structure of Formula (II) above.

Polymers of the invention may be suitably provided by reaction of materials comprising one or more aromatic difluorides.

For fuel cell applications, one or more polymers as discloses herein may be present in admixture (doped) with one or more ion conductors, particularly one or more acids such as e.g. sulfuric acid, phosphoric acid, hydrochloric acid, nitric acid, heteropolyacids, antimonic acid, phosphatooantimonic acid, and combinations thereof. Phosphoric acid can be a preferred doping agent.

Particularly preferred polymers of the invention can be doped with such ion conductors at high levels, e.g. where the weight ratio of one or more polymers (which may be in the form of a fuel cell membrane):one or more ion conductors (e.g. one or more acids) is 100 percent or more, 150 percent or more, 200 weight percent or more, or 250 or 300 weight percent or more.

The invention also includes a fuel cell assembly or fuel cell that comprises one or more polymers as disclosed herein. Suitable fuel cells comprise a membrane electrode assembly of an anode-membrane-cathode sandwich, e.g. where each electrode in the sandwich structure comprises separate layers including a (i) substrate layer, (ii) a gas diffusion layer and (iii) a reaction layer.

Preferred fuel cells of the invention include hydrogen-based systems.

Other aspects of the invention are disclosed infra.

DETAILED DESCRIPTION

Figure 1:
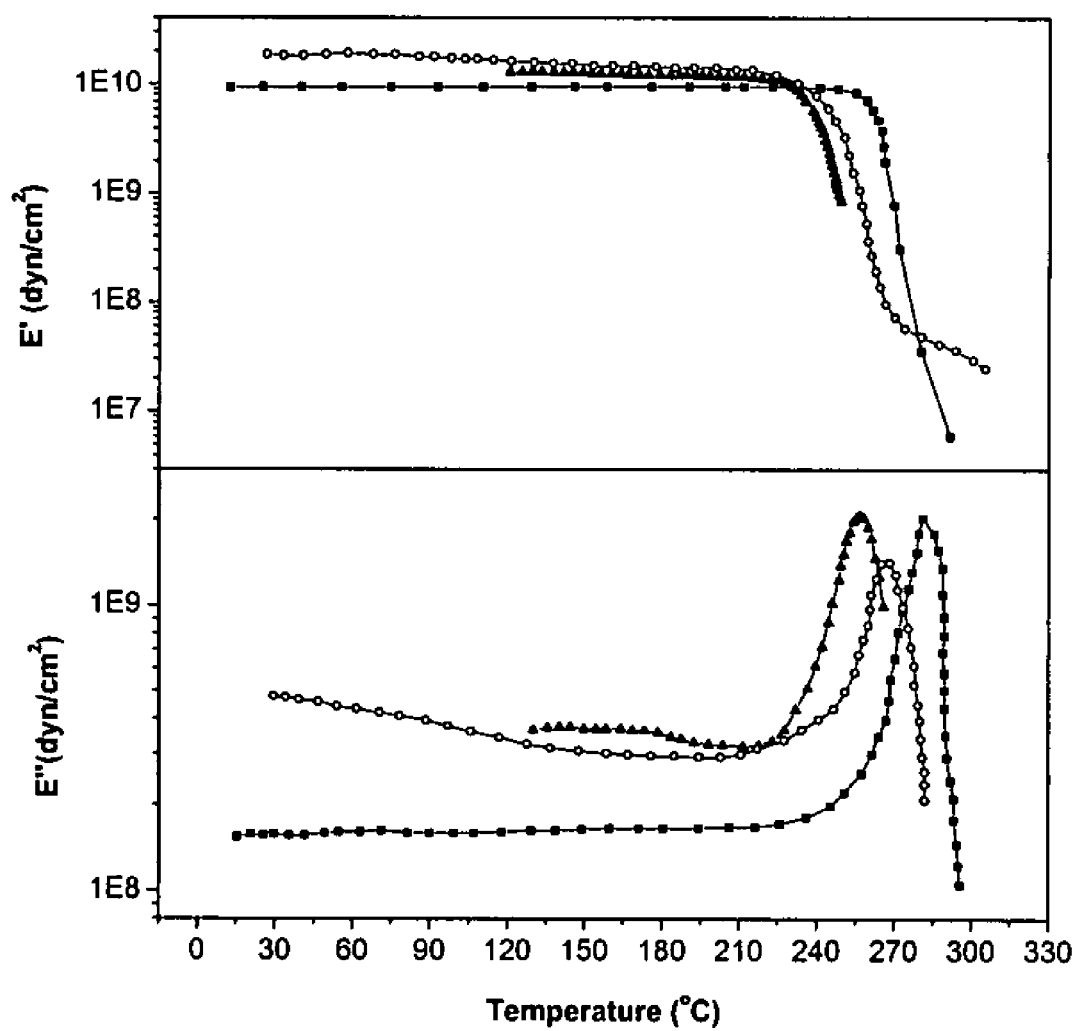
FIG. 1: Temperature dependence of the storage (E') and loss (E") modulus of polymer 1 (▲), copolymer 2 (■) and polymer 1/copolymer 2 50/50 (○)

The present invention relates to the development, characterization and fuel cell applications of new polymeric materials composed either of pure copolymer or polymer blends bearing pyridine and/or tetramethyl biphenyl moieties.

Polymers of the invention may be suitably prepared by a variety of approaches, including nucleophilic aromatic substitution (R. Viswanathan, B. C. Johnson, J. E. Mc Grath, Polymer 1984, 25, 1827) (W. L. Harisson, F. Wang, J. B. Mecham, V. A. Bhanu, M. Hill, Y. S. Kim, J. E. McGrath, J. Polym. Sci., Part A: Polym. Chem., 41, 2003, 2264) M. J. Sumner, W. L. Harrison, R. M. Weyers, Y. S. Kim, J. E. McGrath, J. S. Riffle, A. Brink, M. H. Brink, J. Membr. Sci., 239, 2004, 119)

Suitably, polymers as disclosed herein may be synthesized via nucleophilic aromatic substitution of aromatic difluorides such as bis-(4-fluorophenyl)sulfone,decafluorobipheynyl,4,4' difluorobenzophenone,bis(4-fluorophenyl)phenylphosphine oxide with tetramethyl biphenyl diols and/or pyridine based diols.

Membranes as disclosed herein may be suitably prepared by film casting of polymer solutions. More particularly, one or more polymers as disclosed herein may be disclosed in a suitable solvent e.g. polar aprotic solvents such as N,N-dimethylacetamide at room temperature while in the case of blends mixing of corresponding polymer solutions in the proper ratio is performed. The solution can be poured into a glass dish and the solvent is evaporated e.g. in an oven at 80-100° C. such as for about 24 h. The resulting membranes can be further dried under reduced pressure and preferably elevated temperature such as at 100-170° C. under vacuum to remove residual solvent. In cases that the polymers present melting temperatures up to 300° C., melt extrusion can be used for continuous membrane preparation.

In preferred aspects, the present polymers can exhibit high oxidative stability as shown by the good mechanical integrity retained after the treatment with $H_2O_2$ (3-30%) in the presence of ferrous ions at 80° C. for 72 h (Fenton's test). Oxidative stability can be further verified using IR and Raman spectroscopy.

Also in preferred aspects, as discussed above, a polymer electrolyte membranes can be doped e.g. suitably with (a) strong acids such as sulfuric acid, phosphoric acid, hydrochloric acid, nitric acid and their combinations, (b) fluorinated sulfonic acids such as trifluoromethane sulfonic acid, tetrafluoroethane 1,2 disulfonic acid, 1,2,3,4 perfluorobutane tetrasulfonic acid, trifluoroacetic acid and their combinations, (c) heteropolyacids with the general formula $[PM_{12}O_{40}]^{+3}$, including $H_3PW_{12}O_{40}.nH_2O$ (PWA), $H_3PMo_{12}O_{40}.nH_2O$ (PMoA) and $H_4SiW_{12}O_{40}.nH_2O$ (SiWA) and their combinations (d) antimonic and phosphatooantimonic acid and their combinations. A particularly preferred preferable doping agent is phosphoric acid. Polymer membranes have been doped at high levels including at doping level is 200-250 wt %.

Preferred polymer membrane systems of the invention can exhibit high conductivity levels such as measured using AC impedance and an in the range of $10^{-2}$ S/cm at room temperature in all studied membranes.

The invention also include fuel cell membrane electrode assemblies comprising polymer electrolyte membranes as disclosed herein. As discussed, high doping levels can be provided by preferred systems, including doping levels of e.g. 150 to 300 weight percent with ion conductors.

Preferred membrane electrode assemblies include a layered sandwich structure herein referred to as membrane electrode assembly (MEA) comprising of anode-membrane-cathode sandwich. Each electrode in this sandwich structure can comprise separate layers. These layers can include a (i) substrate layer, (ii) a gas diffusion layer and (iii) a reaction layer. Individual components may be commercially available such as (i) the substrate layer or materials for gas diffusion layer and the catalysts in (iii) the reaction layer. Preferred MEA structures of the invention can enable high power density (e.g. 300-500 mW/cm² at 1.5 bar pressure, 170-200° C. with $H_2$/Air). This high power density can be is attained by a one or more of (a) use of pore forming agents in the gas diffusion and catalyst containing reaction layers, (b) use of fluorinated ion conducting analogs along with other non-volatile acids (such as phosphoric and polyphosphoric acid) to enhance oxygen solubility and proton conductivity in the catalyst containing layer, and/or (c) choice of hydrophobicity of the carbon paper or cloth backing layer to enable better water management especially in the cathode electrode.

It has been found that hydrogen fuel cells comprising a preferred membrane electrode assembly can be operated at 150° C. constant voltage of −500 mV using dry hydrogen and oxygen at ambient pressure for 500 h.

The general formulas of copolymers and polymers based on aromatic polyethers comprise recurring main chain pyridine and/or tetramethyl biphenyl moieties are mentioned below.

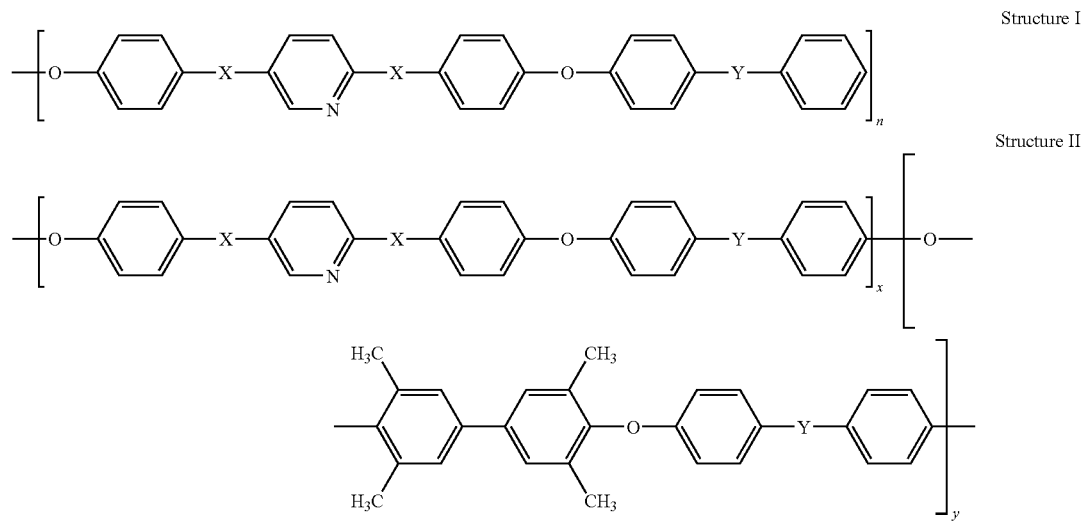

where X is identical or different and is none, alkylene chains or aromatic groups, atoms such as oxygen or sulfur, and groups such as carbonyl or sulfone groups. Alkylene groups are short or long chains having from 1 to 10 carbon atoms. Aromatic units are five or six-membered aromatic or heteroaromatic rings. Aromatic groups may be substituted by 1 to 4 substitutents. Preferred substituents may be hydrogen, halogen atoms, amino groups, hydroxyl groups, cyano groups, or alkyl groups such as methyl or ethyl groups;

Y is identical or different and is sulfone, carbonyl or phenyl phosphinoxide unit.

For the purpose of the present invention, aromatic polyethers comprising recurring pyridine units are preferred. More specifically, the membranes are composed of a polymer of structure 1 and a copolymer of structure 2 at different compositions or the copolymer 2 itself.

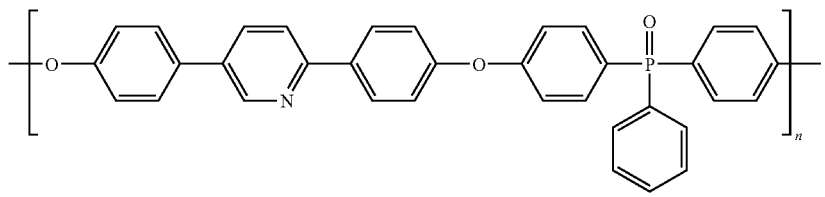

Polymer 1

-continued

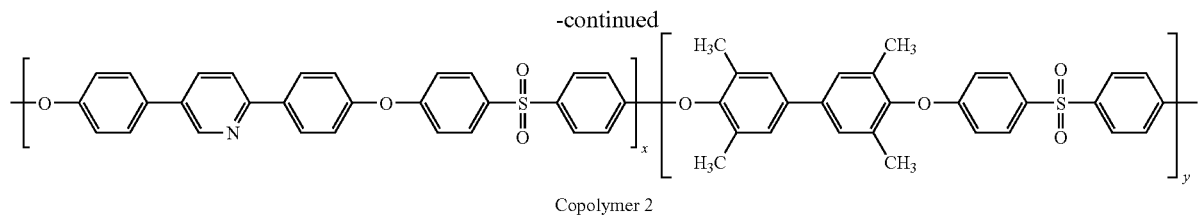

Copolymer 2

In particular aspects, the prepared membranes combine one or more of the required properties to be used as high temperature electrolytes. They posses high Tg values, high thermal and oxidative stability, high doping ability with strong acids and high ionic conductivities.

Polymer 1 and copolymer 2 were synthesized according to published procedures (Chemistry of Materials 2003, 15(46), 5044, Macromolecular Rapid Communications, 2005, 26, 1724). Polymer 1 has high glass transition temperature up to 260° C. and polymer's molecular weight, while copolymer 2 has glass transition temperature in the range of 250-280° C. depending on the copolymer composition and molecular weight.

Figure 2:
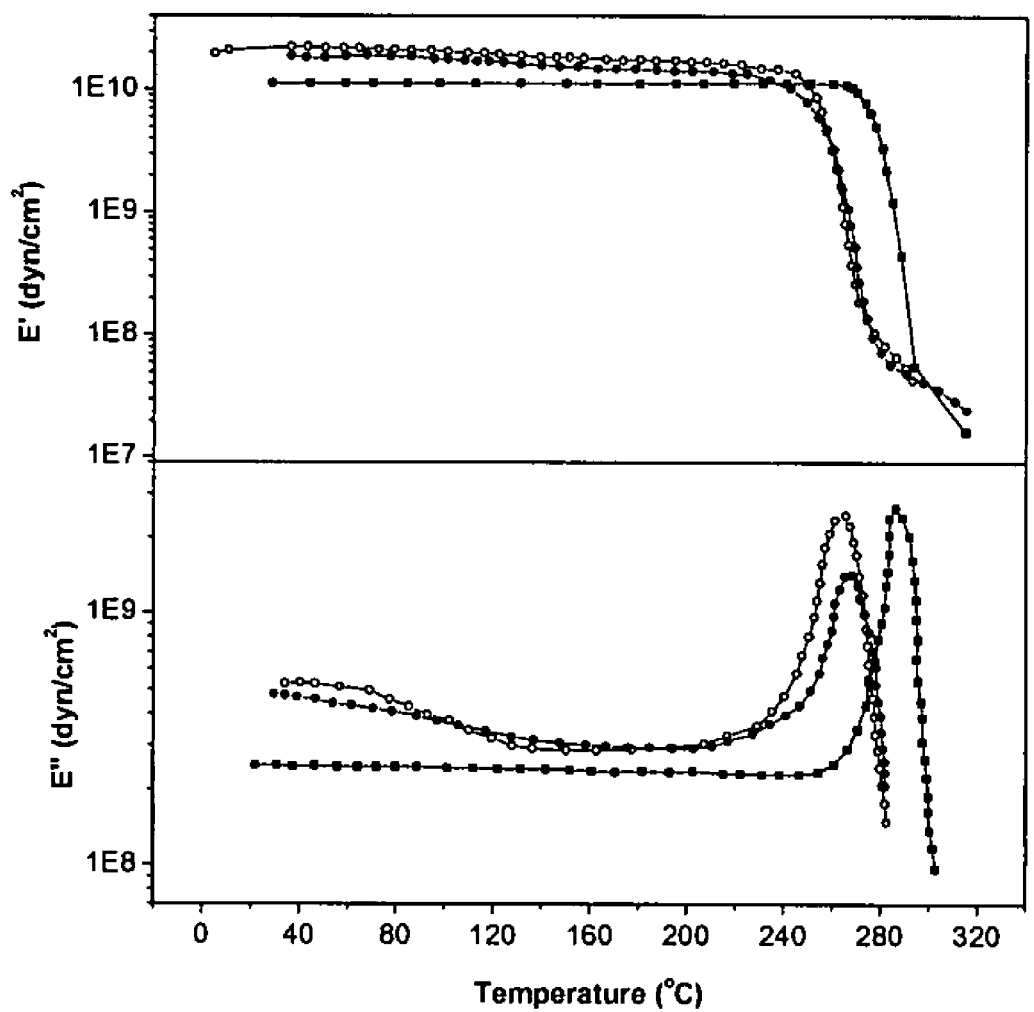
FIG. 2: Temperature dependence of the storage (E') and loss (E") modulus of copolymer 2 (■) polymer 1/copolymer 2 25/75 (○) and polymer 1/copolymer 2 50/50 (•) blends after treatment with $H_2O_2$.
Figure 3:
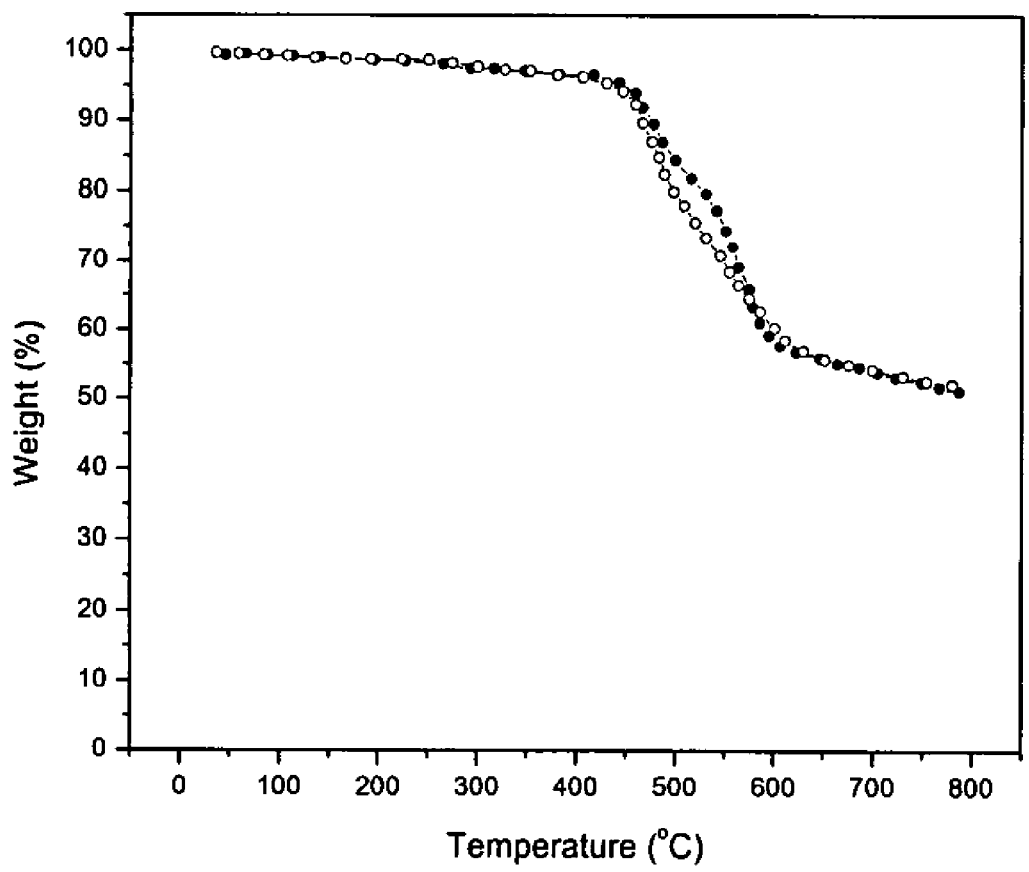
FIG. 3: TGA thermogram of polymer 1/copolymer 2 25/75 (○) and polymer 1/copolymer 2 50/50 (•) blends after the treatment with $H_2O_2$.

Blends of polymer 1 with copolymer 2 at blend compositions 95-5 to 0-100 and were prepared by mixing dimethylacetamide solution of the respective polymers in the proper ratio. The resulting solutions were stirred at room temperature for 3 h and then casted on a glass dish. The solvent was evaporated in an oven at 70-120° C., for 24 h. The membranes were washed with distilled water and dried under vacuum at 170° C. for 72 h. The miscibility behavior of the blends was examined through dynamic mechanical analysis using the single glass transition criterion. The examined blends were found miscible. An example is given in FIG. 1 for the 50/50 polymer 1/copolymer 2 blend where a single Tg is observed at a temperature between the pure polymers $T_g$s denoting the miscibility of this polymer pair. The blend and the pure membranes were tested in respect to their oxidative stability using the Fenton's test. Fenton's test is an accelerated test during which the membranes are exposed to a strongly oxidative environment created by $H_2O_2$ and ferrous ions. All the membranes retain their mechanical integrity and flexibility after the treatment with $H_2O_2$ as proven by dynamic mechanical analysis (FIG. 2). Moreover, thermogravimetric analysis of the blends after the treatment with $H_2O_2$ revealed no change in the thermal stability of the blends as shown in FIG. 3.

Figure 4:
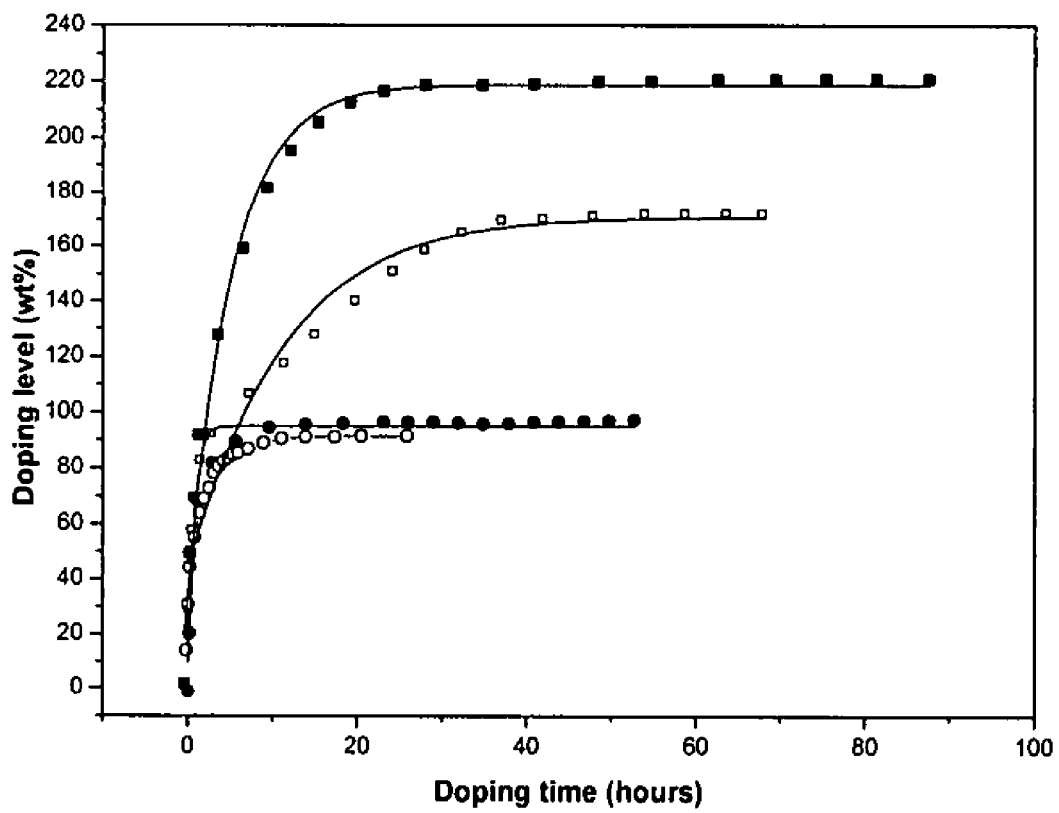
FIG. 4: Time dependence of doping level (wt %) of copolymer 2 at 25° C. (○), 65° C. (●) 80° C. (□) and 100° C. (■)
Figure 5:
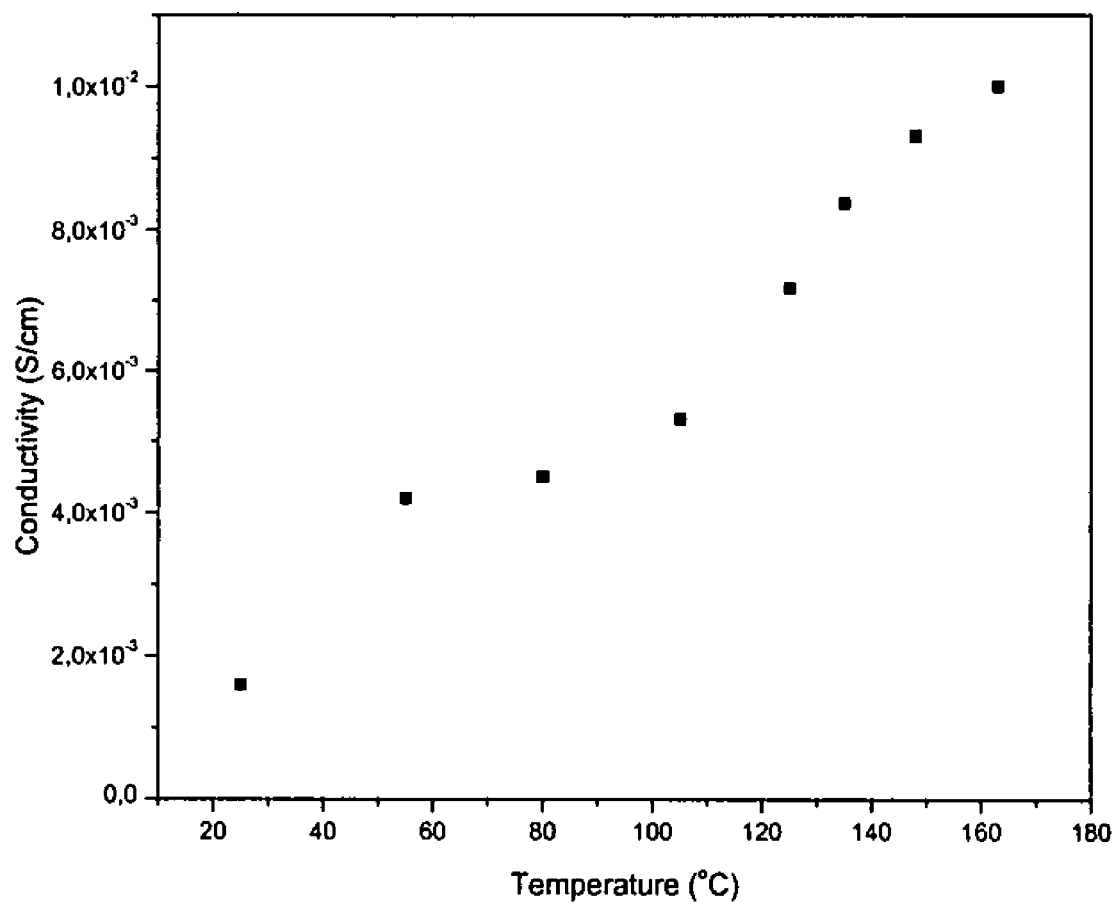
FIG. 5: Temperature dependence of conductivity of the copolymer 2 with doping level 190 wt % at 70% relative humidity

The membranes were doped with phosphoric acid at different temperatures and for different doping times, depending on the membrane composition. An example of the doping behavior of a membrane composed of copolymer 2 is shown in FIG. 4. As the doping temperature increases the phosphoric acid doping level also increases reaching plateau values for higher doping times. A doping level between 100 wt % and 300 wt % phosphoric acid is desirable and most preferably acid uptake between 180 to 250 wt % were used. All the membranes doped in the above-mentioned degree, showed conductivities up to $1*10^{-2}$ S/cm. An example of the temperature dependence of conductivity is given in FIG. 5.

It is the present invention we describe a method for implementing membrane electrode assemblies with above mentioned improvements using the new polymer electrolytes as described in this invention. The implementation of membrane electrode assembly comprises of (a) gas diffusion and current collecting electrode component, (b) newly formulated reaction layer component comprising of the catalyst, ion conducting elements in conjunction with crosslinkers and (c) the choice of Pt alloy electrocatalysts for enhanced CO tolerance and oxygen reduction reaction activity.

Gas Diffusion Electrode Component.

A variety of materials may be utilized as an electrode component. For instance, the electrically conducting substrate may be suitably chosen from a combination of woven carbon cloth (such as Toray fiber T-300) or paper (such as the Toray TGP-H-120), previously wet-proofed using TFE based solutions (DuPont, USA). The typical porosity of this carbon substrate is between 75-85%. The wet proofing is achieved with a combination of dip coating for fixed duration (between 30 seconds to 5 minutes) followed with drying in flowing air. Such a wet proofed substrate is coated with a gas diffusion layer comprising of select carbon blacks and PTFE suspension. The choice of carbon blacks used in this layer ranged from Ketjen black to turbostratic carbons such as Vulcan XC-72 (Cabot Corp, USA) with typical surface areas in the range of 250 to 1000 $m^2$/gm. The deposition being afforded by a coating machine such as Gravure coaters from Euclid coating systems (Bay City, Mich., USA). A slurry comprising of a composition of carbon black and PTFE (poly tetrafluoro ethylene) aqueous suspension (such as Dupont TFE-30, Dupont USA) is applied to a set thickness over the carbon paper or cloth substrate with the aid of the coating machine. Typical thickness of 50-500 microns is used. It is also stated that pore forming agents are used to prepare this diffusion layer on the carbon conducting paper or cloth substrate. Careful control of the pore formers which consist of various combinations of carbonates and bicarbonates (such as ammonium and sodium analogs) affords control of gas access to the reaction zone. This is achieved by incorporation of these agents in the slurry mixture comprising of carbon black and PTFE suspension. Typical porosity rendered in this fashion differs from anode and cathode electrode and is in the range of 10-90%. Coated carbon substrates containing the gas diffusion layers were sintered to enable proper binding of components; this is achieved using thermal treatment to temperatures significantly above the glass transition point for PTFE, usually in the range 100 to 350° C. for 5 to 30 mins.

Formation of Reaction Layer Comprising of Electrocatalyst and Ion Conducting Components:

On the surface of the above mentioned gas diffusion layer an additional layer comprising of a carbon supported catalyst, ion conducting elements (such as phosphoric acid, polyphosphoric acid or perfluoro sulfonic acid analogs), pore forming agents, and binder (such as PTFE, using TFE-30 dispersion, from Dupont, USA) is added using a variety of methods comprising of spraying, calendaring and or screen printing.

Typical steps involve first appropriate choice of the electrocatalyst based on anode or cathode electrodes. For Anode Pt in conjunction of another transition metal such as Ru, Mo, Sn is used. This is motivated by the formation of oxides on these non noble transition metals at lower potentials to enable oxidation of CO or other $C_1$ moieties which are typical poisons in the output feed of fuel reformers (steam reformation of natural gas, methanol, etc.). The choice of electrocatalyst included Pt second transition element either alloyed or in the form of mixed oxides. The choice dependant on the application based on choice of fuel feed-stock. The electrocatalysts are in the form of nanostructured metal alloys or mixed oxide dispersions on carbon blacks (turbostratic carbon support materials usually Ketjen black or similar material)

At the cathode electrocatalysts which are relatively immune from anion adsorption and oxide formation are preferred. In this case the choice of the alloying element ranges between available first row transition elements typically Ni, Co, Cr, Mn, Fe, V, Ti, etc. Prior recent studies have shown that adequate alloying of these transition elements with Pt results in deactivation of Pt for most surface processes (lowering of surface workfunction) (Mukerjee and Urian 2002; Teliska, Murthi et al. 2003; Murthi, Urian et al. 2004; Teliska, Murthi et al. 2005). This renders the surface largely bare for molecular oxygen adsorption and subsequent reduction. Lowering anion adsorption such as phosphate anion for a phosphoric acid based ion conductor is crucial for enabling enhanced oxygen reduction kinetics. In addition to choice of alloys the use of perfluorosulfonic acids either alone or as a blend with other ion conductors is used to enhance oxygen solubility. It is well known that oxygen solubility is approximately eight times higher in these fluorinated analogs as compared to phosphoric acid based components (Zhang, Ma et al. 2003). The electrocatalyst of choice is obtained from commercial vendors such as Columbian Chemicals (Marrietta, Ga., USA), Cabot Superior Micro-powders (Albuquerque, N. Mex., USA). The typical weight ratio of the catalyst on carbon support being 30-60% of metal on carbon.

Second step involves preparation of slurry using a combination of electrocatalyst in a suspension containing solubilized form of the polymer substrate (structures I and II), ion conducting element in a blend of phosphoric acid, polyphoshoric acid, and analogs of perfluorinated sulfonic acids together with PTFE (Dupont, USA) as a binder. Additionally pore forming components based on a combination of carbonates and bicarbonates are added in a ratio of 5-10% by weight. The ratio of the components have a variation of 10-30% within choice of each component enabling a total catalyst loading 0.3 to 0.4 mg of Pt or Pt alloy/$cm^2$. The application of the slurry is achieved via a combination or exclusive application of calendaring, screen printing or spraying.

Catalyst application so achieved in the form of a reaction layer is followed by a third step which comprises of sintering and drying of electrode layer. In this step the electrodes are subjected to two step process initially involving drying at 160° C. for 30 mins followed by sintering at temperatures in the range of 150-350° C. for a time period in the range of 30 mins to 5 hrs.

Formation of Membrane Electrode Assembly:

Preparation of Membrane Electrode Assembly Required the Use of a Die where the sandwich of anode membrane and cathode electrodes is placed in an appropriate arrangement of gasket materials, typically a combination of polyimide and polytetrafluorethylene (PTFE, Dupont, USA). This is followed by hot pressing using a hydraulic press. Pressures in the range of 0.1 to 10 bars are applied with platen temperatures in the range of 150 to 250° C. for time periods typically in the range of 10 to 60 mins. The membrane electrode assemblies so prepared have thickness in the range of 75 to 250 micro meters. This provides for a final assembly of the membrane electrode assembly.

As background, prior approaches of making membrane electrode assemblies have included: (i) direct membrane catalyzation, (ii) catalyzation of coated electrode substrates, (iii) need for effecting membrane electrode bonding for seamless proton transport (iv) effective solubility of reactant gases (in particular oxygen), (v) use of pore forming agents for effective gas transport within the electrode structure. This is with the specific objective of enhancing mass transport and the ability to operate a fuel cell on a sustained higher power density level.

In the context of these prior art as collated below it is our contention that our claims as enumerated in this application provide for a more effective control of interfacial transport of dissolved reactants, protons, and electrons while preventing and minimizing the dissolution of ionic component i.e., phosphoric acid or its improved analog under the broad classification of perfluorinated sulfonic acids (PFSA).

In the context of prior art, direct catalyzation of the membrane has been described in various patents and scientific literature primarily on aqueous based polymer electrolytes, most notably of the perfluorinated sulfonic acid type. At the current state of the technology, prior efforts together with current approaches have to be tempered with ability to translate developments in this regard to mass manufacturability keeping reproducibility (batch vs. continuous) and cost in perspective. Depending on the deposition methods used, the approach towards lowering noble metal loading can be classified into four broad categories, (i) thin film formation with carbon supported electrocatalysts, (ii) pulse electrodeposition of noble metals (Pt and Pt alloys), (iii) sputter deposition (iv) pulse laser deposition and (v) ion-beam deposition. While the principal aim in all these efforts is to improve the charge transfer efficiency at the interface, it is important to note that while some of these approaches provide for a better interfacial contact allowing for efficient movement of ions, electrons and dissolved reactants in the reaction zone, others additionally effect modification of the electrocatalyst surface (such as those rendered via sputtering, electrodeposition or other deposition methods).

In the first of the four broad categories using the 'thin film' approach in conjunction with conventional carbon supported electrocatalysts, several variations have been reported, these include (a) the so called 'decal' approach where the electrocatalyst layer is cast on a PTFE blank and then decaled on to the membrane (Wilson and Gottesfeld 1992; Chun, Kim et al. 1998). Alternatively an 'ink' comprising of Nafion® solution, water, glycerol and electrocatalyst is coated directly on to the membrane (in the $Na^+$ form) (Wilson and Gottesfeld 1992). These catalyst coated membranes are subsequently dried (under vacuum, 160° C.) and ion exchanged to the $H^+$ form (Wilson and Gottesfeld 1992). Modifications to this approach have been reported with variations to choice of solvents and heat treatment (Qi and Kaufman 2003; Xiong and Manthiram 2005) as well as choice of carbon supports with different microstructure (Uchida, Fukuoka et al. 1998). Other variations to the 'thin film' approach have also been reported such as those using variations in ionomer blends (Figueroa 2005), ink formulations (Yamafuku, Totsuka et al. 2004), spraying techniques (Mosdale, Wakizoe et al. 1994; Kumar and Parthasarathy 1998), pore forming agents (Shao, Yi et al. 2000), and various ion exchange processes (Tsumura, Hitomi et al. 2003). At its core this approach relies on extending the reaction zone further into the electrode structure away from the membrane, thereby providing for a more three dimensional zone for charge transfer. Most of the variations reported above thereby enable improved transport of ions, electrons and dissolved reactant and products in this 'reaction layer' motivated by need to improve electrocatalyst utilization. These attempts in conjunction with use of Pt alloy electrocatalysts have formed the bulk of the current state of the art in the PEM fuel cell technology. Among the limitations of this approach are problems with controlling the Pt particle size (with loading on carbon in excess of 40%), uniformity of deposition in large scale production and cost (due to several complex processes and/or steps involved).

An alternative method for enabling higher electrocatalyst utilization has been attempted with pulse electrodeposition. Taylor et al., (Taylor, Anderson et al. 1992) one of the first to report this approach used pulse electrodeposition with Pt salt solutions which relied on their diffusion through thin Nafion® films on carbon support enabling electrodeposition in regions of ionic and electronic contact on the electrode surface. See a recent review on this method by Taylor et al., describing various approaches to pulse electrodeposition of catalytic metals (Taylor and Inman 2000). In principal this methodology is similar to the 'thin film' approach described above, albeit with a more efficient electrocatalyst utilization, since the deposition of electrocatalysts theoretically happens at the most efficient contact zones for ionic and electronic pathways. Improvements to this approach have been reported such as by Antoine and Durand (Antoine and Durand 2001) and by Popov et al., (Popov 2004). Developments in the pulse algorithms and cell design have enabled narrow particle size range (2-4 nm) with high efficiency factors and mass activities for oxygen reduction. Though attractive, there are concerns on the scalability of this method for mass scale manufacturing.

Sputter deposition of metals on carbon gas diffusion media is another alternative approach. Here however interfacial reaction zone is more in the front surface of the electrode at the interface with the membrane. The original approach in this case was to put a layer of sputter deposit on top of a regular Pt/C containing conventional gas diffusion electrode. Such an approach (Mukerjee, Srinivasan et al. 1993) exhibited a boost in performance by moving part of the interfacial reaction zone in the immediate vicinity of the membrane. Recently, Hirano et al. (Hirano, Kim et al. 1997) reported promising results with thin layer of sputter deposited Pt on wet proofed non catalyzed gas diffusion electrode (equivalent to 0.01 $mg_{Pt}/cm^2$) with similar results as compared to a conventional Pt/C (0.4 $mg_{Pt}/cm^2$) electrode obtained commercially. Later Cha and Lee (Cha and Lee 1999), have used an approach with multiple sputtered layers (5 nm layers) of Pt interspersed with Nafion®-carbon-isopropanol ink, (total loading equivalent of 0.043 $mg_{Pt}/cm^2$) exhibiting equivalent performance to conventional commercial electrodes with 0.4 $mg_{Pt}/cm^2$. Huag et al. (Haug 2002) studied the effect of substrate on the sputtered electrodes. Further, O'Hare et al., on a study of the sputter layer thickness has reported best results with a 10 nm thick layer. Further, significant advancements have been made with sputter deposition as applied to direct methanol fuel cells (DMFC) by Witham et al. (Witham, Chun et al. 2000; Witham, Valdez et al. 2001), wherein several fold enhancements in DMFC performance was reported compared to electrodes containing unsupported PtRu catalyst. Catalyst utilization of 2300 mW/mg at a current density of 260 to 380 $mA/cm^2$ was reported (Witham, Chun et al. 2000; Witham, Valdez et al. 2001). While the sputtering technique provides for a cheap direct deposition method, the principal drawback is the durability. In most cases the deposition has relatively poor adherence to the substrate and under variable conditions of load and temperature, there is a greater probability of dissolution and sintering of the deposits.

An alternative method dealing direct deposition was recently reported using pulsed laser deposition (Cunningham, Irissou et al. 2003). Excellent performance was reported with loading of 0.017 $mg_{Pt}/cm^2$ in a PEMFC, however this was only with the anode electrodes, no cathode application has been reported to date.

However, in all these new direct deposition methodologies, mass manufacturability with adequate control on reproducibility remains questionable at best. In this regard the methodologies developed by 3 M company is noteworthy, where mass manufacture of electrodes with low noble metal loading is reported (Debe, Pham et al. 1999; Debe, Poirier et al. 1999). Here a series of vacuum deposition steps are involved with adequate selection of solvents and carbon blacks resulting in nanostructured noble metal containing carbon fibrils which are embedded into the ionomer-membrane interface (Debe, Haugen et al. 1999; Debe, Larson et al. 1999).

An alternative is the use of ion-beam techniques, where the benefits of low energy ion bombardment concurrent to thin film vacuum deposition (electron beam) process is exploited for achieving dense, adhering and robust depositions (Hirvonen 2004). This method has been recently reviewed (Hirvonen 2004) in terms of both mechanisms of ion/solid interactions during thin film growth as well as development of various protocols for specific application areas, including tribology, anti corrosion coatings, superconducting buffer layers and coatings on temperature sensitive substrates such as polymers. Modifications of this approach to prepare 3-D structures including overhang and hollow structures have also been recently reported (Hoshino, Watanabe et al. 2003). Use of dual anode ion source for high current ion beam applications has also been reported recently (Kotov 2004), where benefits for mass production environment is discussed.

In this embodiment we describe a method for improving the catalyst utilization at the interface of a polymer electrolyte imbibed with ion conducting components (such as phosphoric, polyphosphoric and analogs of perfluorinated sulfonic acids) so as to enable higher power densities (i.e., 400 $mW/cm^2$ at 0.5 V vs. RHE, 170-180° C., $H_2$/Air). It is further stated that this improved power density is attained with lower Pt loading (0.3 to 0.4 $mg/cm^2$) as compared to the current state of the art which is in the range 0.5 to 1.0 $mg/cm^2$, thus providing for a better gravimetric energy density. A further manifestation of this embodiment is the improved ability to retain ion conducting elements (such as phosphoric, polyphosphoric and analogs of perfluorinated sulfonic acids) within the reaction layer (catalyst containing zone at the interface between the electrode and the membrane). This is particularly important from the perspective of long term sustained power density as well as better tolerance to both load and thermal cycling (especially transitions to below the condensation zone).

The following non-limiting examples are illustrative of the invention. All documents mentioned herein are fully incorporated herein by reference.

EXAMPLE 1

0.5 g of copolymer 2 was dissolved in 15 ml dimethylacetamide at room temperature. The solution was filtrated through glass wool and poured in glass dish of 95 mm diameter. The solvent was slowly evaporated at 70° C. for 24 h and the membrane was washed with water and dried at 170° C. for 48 h under vacuum. The membrane was immersed in 85 wt % phosphoric acid at 100° C. for 10 h in order to reach a doping level of 210 wt %.

EXAMPLE 2

0.5 g of polymer 1 were dissolved in 10 ml chloroform and 0.5 g of copolymer 2 were also dissolved in 10 ml chloroform at room temperature. The two solutions were mixed and stirred at room temperature for 3 h. The solution was filtrated through glass wool and poured in glass dish of 100 mm diameter. The solvent was slowly evaporated at room temperature for 24 h and the membrane was washed with water and dried at 90° C. for 48 h under vacuum. The membrane was immersed in 85 wt % phosphoric acid at 80° C. for 2 h in order to reach a doping level of 240 wt %.

EXAMPLE 3

0.25 g of polymer 1 were dissolved in 5 ml chloroform and 0.75 g of copolymer 2 were also dissolved in 15 ml chloroform at room temperature. The two solutions were mixed and stirred at room temperature for 3 h. The solution was filtrated through glasswool and poured in glass dish of 100 mm diameter. The solvent was slowly evaporated room temperature for 24 h and the membrane was washed with water and dried at 90° C. for 48 h under vacuum. The membrane was immersed in 85 wt % phosphoric acid at 100° C. for 2 h in order to reach a doping level of 250 wt %.

EXAMPLE 4

Carbon paper (Toray TGP H-120) is initially wet proofed by dipping in a TFE-30 dispersion (Dupont, USA). For this a typical loading of 0.6-1.5 mg/cm$^2$ was used. The gas diffusion layer was applied using a slurry comprising of Ketjen black (Engelhard, USA) with a surface area of 250 m$^2$/gm, TFE-30 dispersion (Dupont, USA), ammonium carbonate in a ratio of 60:30:10% respectively. This slurry after adequate stirring was calendared (Gravure coaters from Euclid coating systems (Bay City, Mich., USA) on to the wet proofed carbon paper using a calendaring machine providing for a thickness of 50-100 micro meters. The gas diffusion layer so obtained was next sintered in air using a muffle furnace with adequate venting at a temperature in the range of 100-200° C. for 10 to 15 hrs.

Reaction layer was next deposited using the choice of individual anode and cathode electrocatalysts. For this a separate slurry was prepared containing the electrocatalyst, binder (TFE-30, dispersion from Dupont, USA), ammonium bicarbonate, and a blend of solubilized form of the polymer electrolytes (structures I and II, either alone or in a combined form) and both volatile and non volatile acid (i.e., poly fluorinated sulfonic acid, PFSA in a combination with phosphoric acid) in a ratio ranging between 1:1 to 1:5. This slurry was calendared onto the gas diffusion side of the electrode to make the individual anode and cathode electrodes using the same procedure described above with the aid of the coating machine (Gravure coaters from Euclid coating systems (Bay City, Mich., USA). Further the reaction layer used in the cathode electrode also contained 5% by weight ammonium carbonate to afford pore formation.

Acid doped blended polymer membranes with a combination of structures I and II as described in earlier examples was next used to prepare the membrane electrode assembly. For this a die set up was used with Teflon (Dupont, USA) and polyimide gaskets were used for the appropriate compression and sealing in the single cell. Hot pressing conditions used were 150-250° C. and 10 bar for 25 mins. The membrane electrode assembly so prepared was tested in a 5 cm$^2$ single cell (Fuel Cell technologies, Albuquerque, N. Mex., USA) with the aid of a potentiostat (Autolab PGSTAT-30) in conjunction with a current booster (10 A). Polarization measurements were conducted at 170-200° C., 1.5 bars, H$_2$/Air (2:2 stoichiometric flow). Steady state current was also monitored for stability studies up to 1000 hrs at a constant potential of 0.5 V vs. RHE.

EXAMPLE 5

Figure 6:
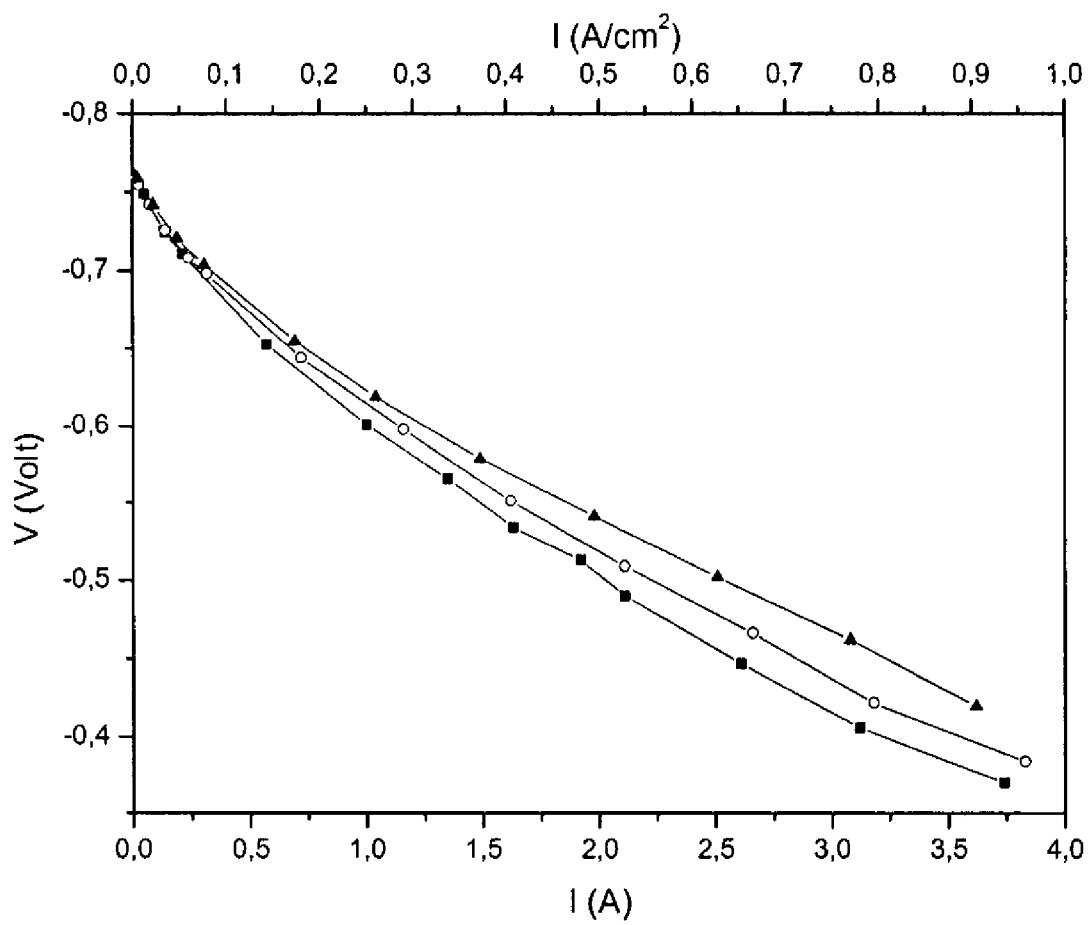
FIG. 6(A): I-V curves of copolymer 2 at 150° C., 160° C. and 170° C. under $H_2/O_2$
FIG. 6(B): I-V curves of copolymer 2 for $H_2/O_2$ (■), $H_2$ (1% CO)/$O_2$ (●), $H_2$ (2% CO)/$O_2$ (▲) at 150° C.
FIG. 6(C): I-V curves of copolymer 2 for $H_2$/air (■), $H_2$ (1% CO)/air (●), $H_2$ (2% CO)/air (▲) at 150° C.
FIG. 6(D): I-V curves of TPS system for $H_2$/air (■), $H_2$ (1% CO)/air (●), $H_2$ (2% CO)/air (▲) at 160° C.
Figure 6:
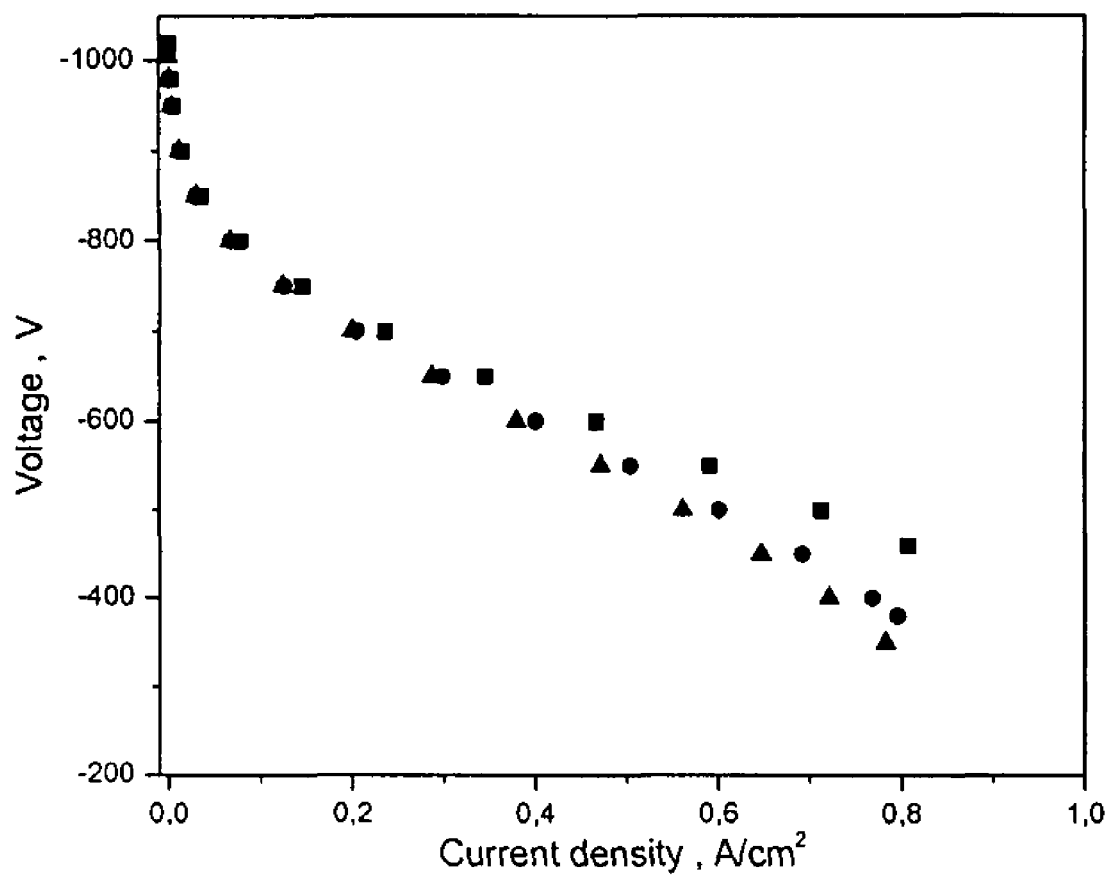
Figure 6:
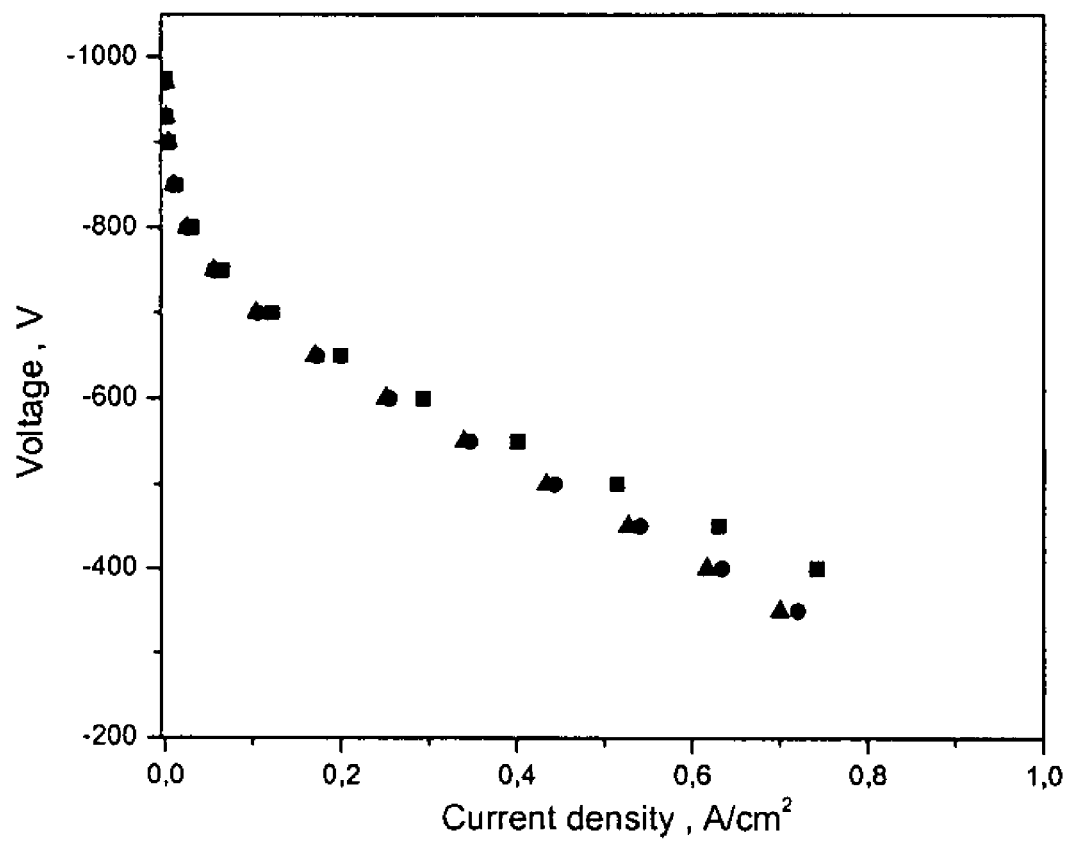
Figure 6:
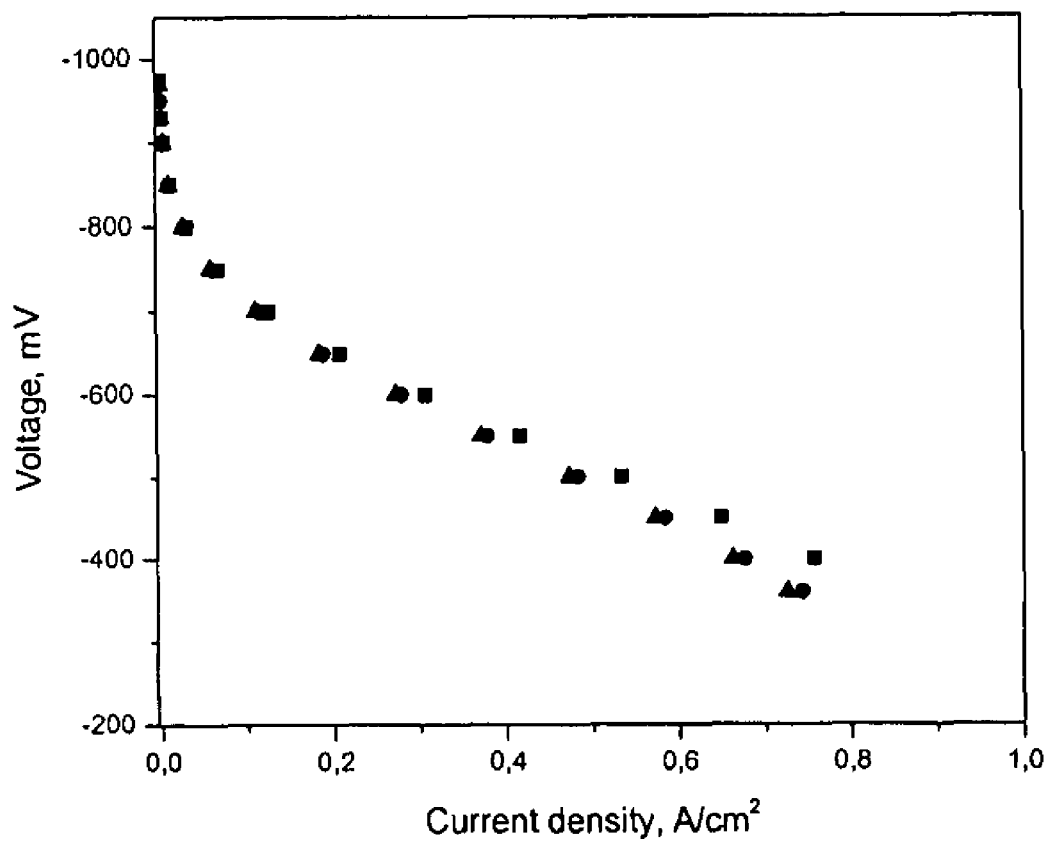

As was mentioned before the assembly was mounted into a 2×2 cm$^2$ single cell. Current versus cell voltage curves were measured at each temperature after the cell performance reached a steady state. Dry hydrogen and oxygen were supplied under atmospheric pressure. FIG. 6(A) shows the I-V plots at temperatures between 150-170° C. At 170° C., a current density of 630 mA/cm$^2$ was obtained at a cell voltage of 500 mV. FIGS. 6(B)-6(D) show the IV plots under H$_2$/O$_2$ and H$_2$/air as well as the CO effect on the performance.

EXAMPLE 6

Stability Test

Figure 7:
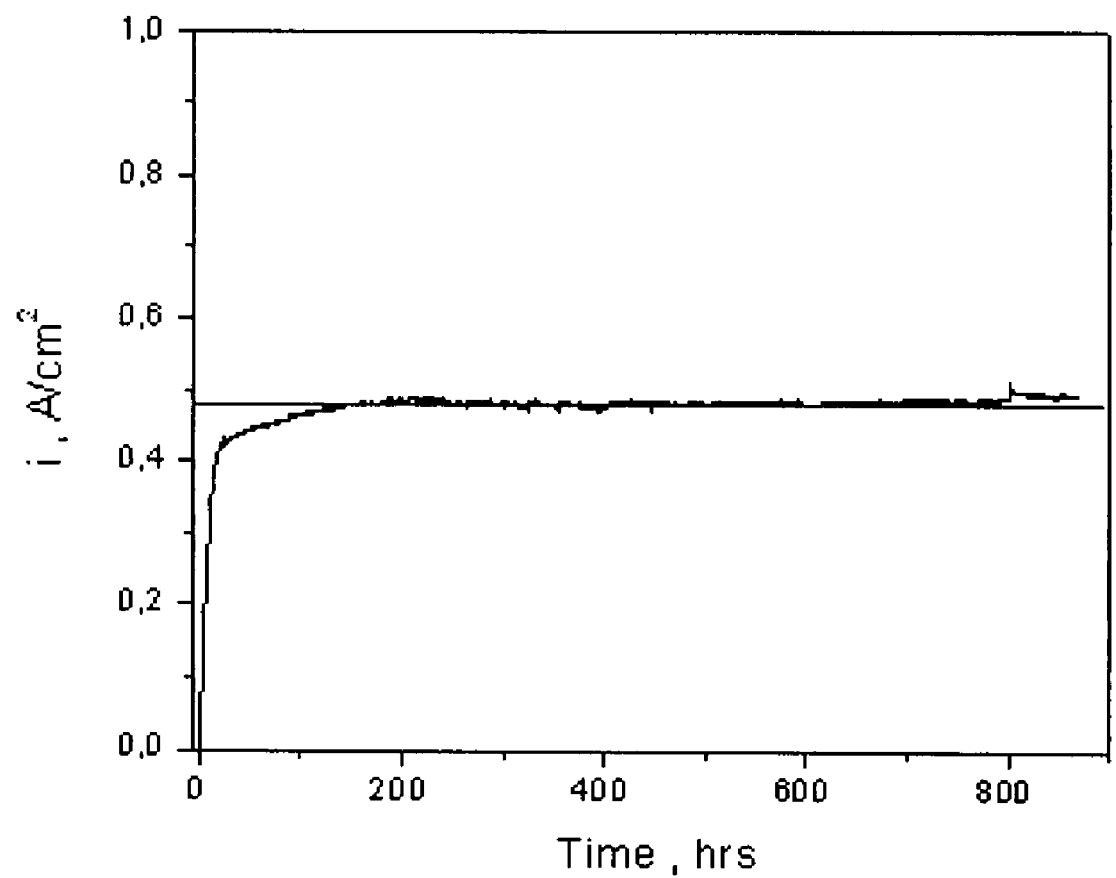
FIG. 7(A): Current density as a function of hours on load operated at constant cell voltage, −500 mV, for the entire test of copolymer 2 membrane. Cell temperature 150° C. Oxygen: 70 cc/min, ambient pressure. Hydrogen: 80 cc/min, ambient pressure.
FIG. 7(B): Thermal cycling (150° C.-40° C.-150° C.) of copolymer 2. Applied voltage: 0.5 V
Figure 7:
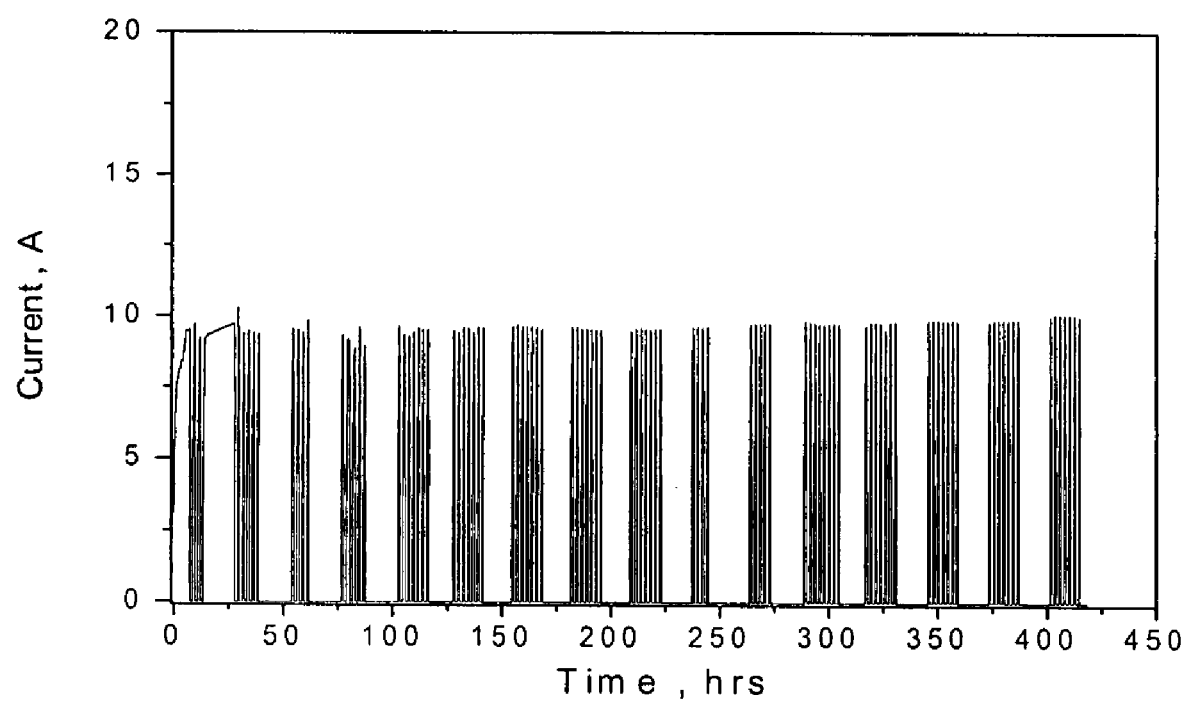

Preliminary stability test was performed for copolymer 2 membrane on a 5×5 cm single cell at a constant voltage of −500 mV and cell temperature 150° C. using dry hydrogen and oxygen at ambient pressure (FIG. 7(A)). After an initial activation of the MEA, a constant current density of 480 mA/cm$^2$ was achieved for 650 h. Until the completion of the stability test, no MEA degradation was observed. FIG. 7(B) depicts the thermal cycling test where successive shut off and turn on do not affect the initial high performance.

CITATIONS

The following documents have been referred to above.

Antoine, O. and R. Durand (2001). "In situ Electrochemical Deposition of Pt Nanoparticles on Carbon and Inside Nafion." *Electrochem. and Solid-State Lett.* 4(5): A55.

Cha, S. Y. and W. M. Lee (1999). *J. Electrochem. Soc.* 146: 4055.

Chun, Y. G., C. S. Kim, et al. (1998). *J. Power Sources* 71: 174.

Cunningham, N., E. Irissou, et al. (2003). "PEMFC Anode with Very Low Pt Loadings Using Pulsed Laser Deposition." *Electrochem. and Solid-State Lett.* 6(7): A125-A128.

Debe, M. K., G. M. Haugen, et al. (1999). Catalyst for membrane electrode assembly and method of making. U.S. patent: 20.

Debe, M. K., J. M. Larson, et al. (1999). Membrane electrode assemblies. U.S. patent: 86.

Debe, M. K., T. N. Pham, et al. (1999). Process of forming a membrane electrode. U.S. patent: 54.

Debe, M. K., R. J. Poirier, et al. (1999). Membrane electrode assembly. U.S. patent: 42.

Figueroa, J. C. (2005). Fabrication and use of electrodes and other fuel cell components having ultra low catalyst loadings coated thereon. WO Pat., (E.I. Dupont de Nemours and Company, USA). 24 pp.

Haug, A. T. (2002). Development of low-loading, carbon monoxide tolerant PEM fuel cell electrodes: 185.

Hirano, S., J. Kim, et al. (1997). "High performance proton exchange membrane fuel cells with sputter-deposited Pt layer electrodes." *Electrochim. Acta* 42(10): 1587-1593.

Hirvonen, J. K. (2004). "Ion beam assisted deposition." *Mat Res. Soc. Symposium Proceedings* 792(Radiation Effects and Ion-Beam Processing of Materials): 647-657.

Hoshino, T., K. Watanabe, et al. (2003). "Development of three-dimensional pattern-generating system for focused-ion-beam chemical-vapor deposition." *J. Vac. Sci. Tech., B: Microelectronics and Nanometer Structures-Processing, Measurement, and Phenomena* 21(6): 2732-2736.

Kotov, D. A. (2004). "Broad beam low-energy ion source for ion-beam assisted deposition and material processing." *Rev. Sci. Inst.* 75(5, Pt. 2): 1934-1936.

Kumar, G. S. and S. Parthasarathy (1998). A method of manufacture of high performance fuel cell electrodes with very low platinum loading. IN Pat., (India). 13 pp.

Mosdale, R., M. Wakizoe, et al. (1994). "Fabrication of electrodes for proton exchange-membrane fuel cells (PEMFCs) by spraying method and their performance evaluation." *Proc.-Electrochem. Soc.* 94-23(Electrode Materials and Processes for Energy Conversion and Storage): 179-89.

Mukerjee, S., S. Srinivasan, et al. (1993). "Effect of sputtered film of platinum on low platinum loading electrodes on electrode. Kinetics of oxygen reduction in proton exchange membrane fuel cells." *Electrochimica. Acta* 38(12): 1661-9.

Mukerjee, S. and R. C. Urian (2002). "Bifunctionality in Pt alloy nanocluster electrocatalysts for enhanced methanol oxidation and CO tolerance in PEM fuel Cells: electrochemical and in situ synchrotron spectroscopy." *Electrochim. Acta* 47: 3219-3231.

Murthi, V. S., R. C. Urian, et al. (2004). "Oxygen Reduction Kinetics in Low and Medium Temperature Acid Environment: Correlation of Water Activation and Surface Properties in Supported Pt and Pt Alloy Electrocatalysts." *J. Phys. Chem. B* 108(30): 11011-11023.

Popov, B. N. (2004). "Electrodeposition of alloys and composites with superior corrosion and electrocatalytic properties." *Plating and Surface Finishing* 91(10): 40-49.

Qi, Z. and A. Kaufman (2003). "Low Pt loading high performance cathodes for PEM fuel cells." *J. Power Sources* 113(1): 37-43.

Shao, Z.-G., B.-L. Yi, et al. (2000). "New method for the preparation of the electrodes with very low platinum loading used in proton exchange membrane fuel cell." *Dianhuaxue* 6(3): 317-323.

Taylor, E. J., E. B. Anderson, et al. (1992). "Preparation of high-platinum-utilization gas diffusion electrodes for proton-exchange-membrane fuel cells." *J. Electrochem. Soc.* 139(5): L45-L46.

Taylor, E. J. and M. E. Inman (2000). Electrodeposition of catalytic metals using pulsed electric fields. WO Pat., (Faraday Technology, Inc., USA). 41 pp.

Teliska, M., V. S. Murthi, et al. (2003). *In-Situ Determination of O(H) Adsorption on Pt and Pt based Alloy Electrodes using X-ray Absorption Spectroscopy*. Fundamental Understanding of Electrode Processes, Proc.-Electrochem. Soc, Pennington, N.J.

Teliska, M., V. S. Murthi, et al. (2005). "Correlation of Water Activation, Surface Properties, and Oxygen Reduction Reactivity of Supported Pt-M/C Bimatallic Electrocatalysts using XAS." *J. Electrochem. Soc.* 152: A2159.

Tsumura, N., S. Hitomi, et al. (2003). "Development of Ultra-Low Pt—Ru Binary Alloy Catalyst Loading Gas Diffusion Electrode for PEFC." *GS News Technical Report* 62(1): 21-25.

Uchida, M., Y. Fukuoka, et al. (1998). "Improved preparation process of very-low-platinum-loading electrodes for polymer electrolyte fuel cells." *J. Electrochem. Soc.* 145(11): 3708-3713.

Wilson, M. S. and S. Gottesfeld (1992). *J. App. Electrochem.* 22: 1.

Wilson, M. S. and S. Gottesfeld (1992). "High performance catalyzed membranes of ultra-low platinum loadings for polymer electrolyte fuel cells." *J. Electrochem Soc.* 139(2): L28-L30.

Witham, C. K., W. Chun, et al. (2000). "Performance of direct methanol fuel cells with sputter-deposited anode catalyst layers." *Electrochem. and Solid-State Lett.* 3(11): 497-500.

Witham, C. K., T. I. Valdez, et al. (2001). "Methanol oxidation activity of co-sputter deposited Pt—Ru catalysts." *Proc.-Electrochem. Soc.* 2001-4(Direct Methanol Fuel Cells): 114-122.

Xiong, L. and A. Manthiram (2005). "High performance membrane-electrode assemblies with ultra-low Pt loading for proton exchange membrane fuel cells." *Electrochimica Acta* 50(16-17): 3200-3204.

Yamafuku, T., K. Totsuka, et al. (2004). "Optimization of polymer electrolyte distribution of ultra-low platinum loading electrode for PEFC." *GS News Technical Report* 63(1): 23-27.

Zhang, L., C. Ma, et al. (2003). "Oxygen permeation studies on alternative proton exchange membranes designed for elevated temperature operation." *Electrochim. Acta* 48: 1845-1859.

What is claimed is:

1. A polymer material comprising a structure of the following Formula (II):

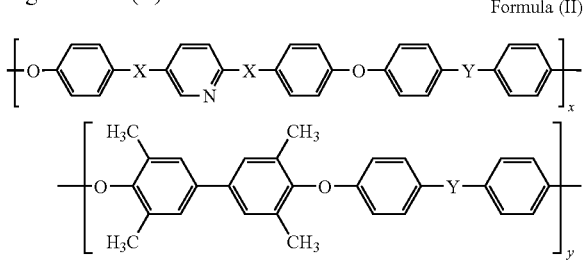

Formula (II)

wherein each X is independently a chemical bond, optionally substituted alkylene, optionally substituted aromatic group, a hetero linkage (O, S or NH), carboxyl or sulfone;

each Y is the same or different and is sulfone, carbonyl or a phenyl phosphinoxide unit; and x and y are positive integers.

2. The polymer material of claim 1 wherein the polymer comprises one or more tetramethyl biphenyl groups.

3. The polymer material of claim 1 or 2 wherein the polymer further comprises a structure of the following Formula (I):

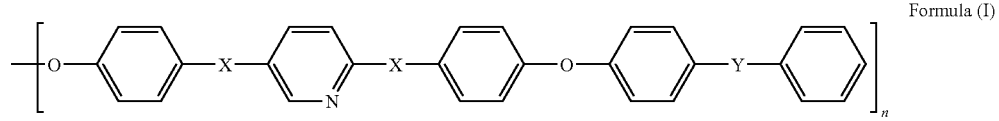

Formula (I)

wherein each X is independently a chemical bond, optionally substituted alkylene, optionally substituted aromatic group, a hetero linkage (O, S or NH), carboxyl or sulfone;

each Y is the same or different and is sulfone, carbonyl or a phenyl phosphinoxide unit; and n is a positive integer.

4. The polymer of claim 3 wherein alkylene groups have 1 to 10 carbon atoms, automatic group are five or six-membered carbocyclic aryl or aromatic or heteroaromatic rings which may be optionally substituted by 1 to 4 moieties such as hydrogen, halogen atoms, amino groups, hydroxyl groups, cyano groups, or alkyl groups such as methyl or ethyl groups.

5. A polymer of claim 1 comprising one or more polymer in the form of block, random, periodic and/or alternating polymers.

6. A polymer of claim 1 comprising two or more distinct polymers.

7. A polymer of claim 3 comprising a first polymer having a structure of Formula (I) and a second polymer having a structure of Formula (II).

8. A polymer of claim 1 obtainable via a nucleophilic aromatic substitution reaction.

9. The polymer of claim 8 wherein the polymer is obtainable by reaction of materials comprising one or more aromatic difluorides.

10. The polymer of claim 1 wherein the polymer is doped with one or more ion conductors.

11. The polymer of claim 1 wherein the polymer is doped with one or more acids.

12. The polymer of claim 11 wherein the one or more acids are selected from sulfuric acid, phosphoric acid, hydrochloric acid, nitric acid, heteropolyacids, antimonic acid, phosphatooantimonic acid, and combinations thereof.

13. The polymer of claim 11 wherein the one or more acids comprise phosphoric acid.

14. The polymer of claim 1 wherein the polymer in the membrane form.

15. The polymer of claim 14 wherein the membrane has an ioconductivity measured using AC impedance in the range of $10^{-2}$ S/cm at room temperature.

16. The polymer of claim 1 wherein the polymer is doped with one or more ion conductors at an amount of about 100 weight percent or more.

17. The polymer of claim 1 wherein the polymer is doped with one or more ion conductors at an amount of about 150 weight percent or more.

18. The polymer of claim 1 wherein the polymer is doped with one or more ion conductors at an amount of about 200 weight percent or more.

19. The polymer of claim 1 wherein the polymer is doped with one or more ion conductors at an amount of about 250 or 300 weight percent or more.

20. The polymer of claim 1 wherein alkylene groups have 1 to 10 carbon atoms, automatic group are five or six-membered carbocyclic aryl or aromatic or heteroaromatic rings which may be optionally substituted by 1 to 4 moieties such as hydrogen, halogen atoms, amino groups, hydroxyl groups, cyano groups, or alkyl groups such as methyl or ethyl groups.

21. A fuel cell membrane assembly comprising a polymer of claim 1.

22. A fuel cell comprising a polymer or assembly of claim 1.

23. The assembly or fuel cell of claim 21 or 22 comprising a membrane electrode assembly of an anode-membrane-cathode sandwich.

24. The assembly or fuel cell of claim 23 wherein each electrode in the sandwich structure comprises separate layers comprising a (i) substrate layer, (ii) a gas diffusion layer and (iii) a reaction layer.

25. The assembly or fuel cell of claim 23 wherein the assembly or fuel cell is a hydrogen fuel cell or fuel cell assembly.

* * * * *